(12) United States Patent
Dvir

(10) Patent No.: US 12,465,667 B2
(45) Date of Patent: Nov. 11, 2025

(54) METHOD OF MANUFACTURING AND DERMAL FILLER COMPOSITIONS CONTAINING HYALURONIC ACID AND HYDROXYAPATITE

(71) Applicant: E.N.A. IMPECCABLE SKINCARE SOLUTIONS LTD, Nesher (IL)

(72) Inventor: Haim Dvir, Nesher (IL)

(73) Assignee: E.N.A. IMPECCABLE SKINCARE SOLUTIONS LTD, Nesher (IL)

( * ) Notice: Subject to any disclaimer, the term of this patent is extended or adjusted under 35 U.S.C. 154(b) by 447 days.

(21) Appl. No.: 16/498,766

(22) PCT Filed: Oct. 9, 2018

(86) PCT No.: PCT/IB2018/057822
§ 371 (c)(1),
(2) Date: Sep. 27, 2019

(87) PCT Pub. No.: WO2019/073386
PCT Pub. Date: Apr. 18, 2019

(65) Prior Publication Data
US 2020/0038552 A1    Feb. 6, 2020

Related U.S. Application Data

(60) Provisional application No. 62/570,189, filed on Oct. 10, 2017.

(51) Int. Cl.
*A61L 27/20* (2006.01)
*A61L 27/12* (2006.01)

(52) U.S. Cl.
CPC .............. *A61L 27/20* (2013.01); *A61L 27/12* (2013.01); *A61L 2400/06* (2013.01); *A61L 2400/18* (2013.01); *A61L 2430/34* (2013.01)

(58) Field of Classification Search
CPC .. A61L 27/20; A61L 2400/06; A61L 2400/12; A61L 2400/18; A61L 2430/34; A61L 27/52; A61L 27/12; A61L 27/58; A61L 27/46; A61L 2430/24; C08L 5/08; C08L 5/10; A61K 8/735; A61Q 19/08; C09C 1/3081; C09C 1/308
See application file for complete search history.

(56) References Cited

U.S. PATENT DOCUMENTS

| | | |
|---|---|---|
| 7,473,731 B2 | 1/2009 | Furuzono et al. |
| 2015/0238525 A1 | 8/2015 | Gavard Molliard |
| 2017/0143870 A1 | 5/2017 | Linko et al. |
| 2018/0193232 A1 | 7/2018 | Gavard Molliard |
| 2018/0318203 A1 | 11/2018 | Krause |

FOREIGN PATENT DOCUMENTS

| | | | |
|---|---|---|---|
| CN | 101596328 A | 12/2009 | |
| CN | 103739869 A | 4/2014 | |
| CN | 104703582 A | 6/2015 | |
| CN | 104853742 A | 8/2015 | |
| DE | 3 156 044 | * 4/2017 | ............... A61K 9/00 |
| EP | 3156044 A1 | 4/2017 | |
| JP | 2004051952 A | 2/2004 | |
| KR | 1020170108194 A | 9/2017 | |

OTHER PUBLICATIONS

Jeong et al. (Journal of Biomaterils Application 31(3), 2016, 464-474). (Year: 2016).*
Deng et al. (J. Mater. Sci: Mater Med (2010) 21:3059-3064) (Year: 2010).*
Gorain et al. (Drug Discovery Today, vol. 22, No. 4, Apr. 2017 pp. 652-664). (Year: 2017).*
Liao Jin-Guo et al.: "Surface Modification of Nano-Hydroxyapatite with Silane Agent", Journal of Inorganic Material, vol. 23, No. 1, Jan. 2008—English abstract.
Deng C. et al.: "Preparation and mechanical property of poly($\epsilon$-caprolactone)-matrix composites containing nano-apatite fillers modified by silane coupling agents", Journal of Material Science: Materials in Medicine, Kluwer Academic Publishers, BO, (Oct. 1, 2010), vol. 21, No. 12, DOI: 10.1007/s10856-010-4158-6.
Xiuwei Pan et al.: "Synthesis, characterization and chondrocyte culture of polyhedral oligomeric silsesquioxane (POSS)-containing hybrid hydrogels", RSC Advances, Issue 28, 2016.
Lauren Edgar et al.: "Heterogeneity of Scaffold Biomaterials in Tissue Engineering", MDPI Journal, May 3, 2016.
Xiangdong Bi et al.: "Thiol-ene crosslinking polyamidoamine dendrimer-hyaluronic acid hydrogel system for biomedical applications", Journal of Biomaterial Science, 2016, vol. 27 No. 8, 743-757.
Bapi Gorain et al.: "The use of nanoscaffolds and dendrimers in tissue engineering", Drug Discovery Today, vol. 22, No. 4, Apr. 2017.
Lu Lu et al.: "Reversible pH-responsive aggregates based on the self-assembly of functionalized POSS and hyaluronic acid", Carbohydrate Polymers, vol. 94, Issue 1, Apr. 2013.

* cited by examiner

*Primary Examiner* — Alma Pipic
(74) *Attorney, Agent, or Firm* — William H. Dippert; Laurence A. Greenberg; Werner H. Stemer

(57) ABSTRACT

Compositions based on HA and HAp in the field of soft tissue fillers, and a method of manufacturing thereof. Optionally, the dermal fillers are useful for enhancing facial tissue augmentation by adding volume to facial tissue, correct wrinkles and folds and restore a smooth appearance to the face. Optionally, the dermal filler comprises uncrosslinked or crosslinked HA chemically bonded to HAp.

18 Claims, 1 Drawing Sheet

METHOD OF MANUFACTURING AND DERMAL FILLER COMPOSITIONS CONTAINING HYALURONIC ACID AND HYDROXYAPATITE

CROSS-REFERENCE TO RELATED PATENT APPLICATIONS

This patent application is a U.S. National Phase filing under 35 U.S.C. § 371 of PCT Patent Application No. PCT/IB2018/057822, filed Oct. 9, 2018, which is based upon and claims the priority of U.S. Provisional Patent Application Ser. No. 62/570,189, filed Oct. 10, 2017, each of which is incorporated herein by reference in its entirety.

FIELD

The invention relates generally to soft tissue fillers and specifically to dermal and subdermal implantable fillers based on hyaluronic acid and hydroxyapatite, separately and in combination.

BACKGROUND

The skin comprises three layers and each layer performs specific tasks. The outer thin and tough layer is the epidermis. The epidermis varies in thickness from 0.05 mm on the eyelids to 0.8-1.5 mm on the soles of the feet and palms of the hand. Most of the cells in the epidermis are keratinocytes. New keratinocytes originate from cells in the deepest layer of the epidermis called the basal layer and migrate up toward the surface of the epidermis replacing old cells. Stratum corneum, the outermost portion of the epidermis, is a waterproof barrier that prevents most bacteria, viruses and chemical substances from entering the body. Melanocyte cells are scattered throughout the basal layer and produce the pigment melanin, which contributes to skin color and filters ultraviolet radiation. The epidermis also contains Langerhans cells, which are part of the skin's immune system defending the body against infection. Under the epidermis is the dermis. The dermis varies in thickness from 0.6 mm on the eyelids to 3-5 mm on the soles of the feet and palms of the hand.

The dermis is a thick layer of fibrous and elastic tissue made mostly of collagen, elastin and fibrillin that give the skin its flexibility and strength. Collagen fibers make up 70% of the dermis, giving it strength and toughness while elastin maintains normal elasticity and flexibility. It contains nerve endings that sense pain, touch, pressure and temperature. It contains sweat glands that produce sweat in response to heat and stress helping in cooling the body. It contains oil (sebaceous) glands that stow oil (sebum) into hair follicles keeping the skin moist and soft. It contains hair follicles which help in regulating body temperature, providing protection from injury and enhancing sensation. It contains blood vessels that provide nutrients to the skin and help regulate body temperature. Under the dermis is the hypodermis, also known as the subcutaneous fat layer or subcutaneous tissue. It is a layer of fat, about 50% of body fat. The fat is contained in living cells, called fat cells, held together by fibrous tissue. The fat layer attaches the skin to the bones and muscles and helps in insulating the body, providing protective padding and serving as an energy storage area.

Facial aging is a manifest of a dynamic process that occurs throughout our lifetime due to cumulative effects on the skin, soft tissues and craniofacial skeleton resulting in skin superficial textural wrinkling, topography and loss of facial volume. The effects of such aging include gravitational force, progressive bone resorption, decrease in tissue elasticity and subcutaneous fat redistribution and loss of fullness. Hormonal imbalance, sun exposure, mental stress, diet, work habits, disease, drug abuse and smoking also may affect facial attractiveness.

Bone atrophy and dynamics of bone expansion and bone loss are the cause for craniofacial skeleton aging. Bone resorption may lead to biometric volume loss and the overlying soft tissues and skin may undergo significant changes without the structural support of the bone. For example, maxillary resorption may lead to loss of support in the upper lip and may lead to displacement of the malar fat pad and thus contribute to perioral wrinkling and nasolabial folds respectively. A youthful face is characterized by a rounded facial topography due to balanced distribution of superficial and deep fat giving fullness to soft tissues. Redistribution and loss of fat cause gradual loss in soft tissue support and fullness resulting in soft tissue descent, for example loss of fat at the forehead, malar, etc. and gain of fat at the jowls, nasolabial folds, etc.

When considering facial appearance and structure, is convenient to divide the face into three areas where the upper third include the forehead and brows, the middle third includes the midface and nose and the lower third includes the chin, jawline and neck. The midface includes the eyes, nose, lips and cheek bones (central facial triangle) that contribute mostly to the perception of facial aesthetics and attractiveness.

The upper face, which includes the forehead, brow, temple and upper eyelid area, is affected by the loss of subcutaneous fullness giving rise to forehead lines. The muscle action at this area is relatively concealed at youth by the subcutaneous fullness of the forehead. As it ages, the loss of fullness gives rise to wrinkles and folds. Impression of brow ptosis is a result of loss of lateral brow support and loss of fullness in the upper eyelid.

The midface, which includes the eyes, nose, lips and cheek bones (central facial triangle), is affected by the loss of subcutaneous fullness. "Crow's feet" are a result of loss of subcutaneous fullness around the orbicularis oculi muscle. Also, the border of the orbicularis oculi muscle becomes evident and contributes to the development of the malar crescent over the zygomatic eminence and the nasojugal fold. Periorbital tear trough depression occurs with age as fat stored in the lower eyelid depletes giving rise to a gaunt appearance. Between the orbicularis oculi muscle and the lower eyelid, the loss of fullness brings the tissues into closer proximity resulting in darker skin coloration and a tired, exhausted eye appearance even after a good night's sleep. The dark coloration may also be attributable to dermal melanin deposition. Nasolabial folds are caused due to ptotic cheek fat descend. The nose is also subject to aging effects such as loss of fullness in the glabella, nasion and upper dorsum (cephalic nose) and nasal tip ptosis contributing to illusion of increased nasal length. Ptotic chin may also contribute to the appearance of increased nasal length. The lower face which include the chin, jawline and neck, exhibit fat accumulation with increasing age resulting in relatively excess of skin leading to loss of definition of the jawline. The descent of fat to the mandibular border leads to the formation of facial jowls. "Turkey neck" deformity is the result of ptosis of the unsupported skin, chin pad and the downward pull of the platysma muscle resembling a turkey's wattle. Other than that, with age, the contraction of the platysma muscle gives rise to vertical fibrous bands on the neck.

The main goal in facial rejuvenation is the restoration of facial topography. Facial rejuvenation can be achieved by surgical and nonsurgical procedures. Surgery includes a wide range of procedures from lifts to liposuction to fat transfer. Resurfacing techniques are used to modify the surface of the skin, correcting effects of photoaging, including fine lines, irregular pigmentation and blemishes. Resurfacing is achieved by chemical peels, microdermabrasion and laser resurfacing. Nowadays, patients favor and seek for nonsurgical procedures which may restore facial volume, correct facial asymmetry or even enhance existing facial features with immediate cosmetic results and short recovery time. This is achieved by a broad range of substances which are administered by injection. The main usage is for the treatment of lines, wrinkles and folds to compensate on facial volume loss. This includes injections of neurotoxins (Botulinum toxin is used to weaken muscles and minimize dynamic lines), volume fillers and collagen stimulators.

Hyaluronic acid (HA) is a naturally occurring linear polysaccharide composed of repeating disaccharide units of glucuronic acid and N-acetylglucosamine alternately linked by β-1,3 and β-1,4 glycosidic bonds with molecular weight (MW) up to several million Daltons (Da). Under physiological conditions, HA is found in its ionized form, hyaluronate, with sodium, calcium, etc. as the counterion, for example: sodium hyaluronate (NaHA). In the human body, it is found in high concentration in the skin, umbilical cord and vitreous humor. HA is a relatively rigid molecule due to the restriction of rotation of the glycosidic bond by the bulky N-acetyl group adjacent to the glycosidic bond. Its natural occurring conformation is a helix and the helical conformation is further reinforced by the hydrogen bonding formed between the different functional groups (e.g. amine, carboxyl and hydroxyl). The main sources of HA for industrial scales are from animal tissues such as cock's comb which require extensive purification and from microbial streptococcal fermentation such as HA fermentation from *Streptococcus zooepidemicus* bacteria.

HA possesses significant structural, rheological, physiological, and biological functions. HA has the ability to absorb large amounts of water and possess moisture retention ability to form a highly viscoelastic substance in aqueous solution. Due to its absorbance capability and viscoelastic nature coupled with its lack of immunogenicity and toxicity, it can fill, coat, lubricate and sustain mechanical stress in tissues. Thus, HA finds various applications in cosmetic, biomedical, pharmaceutical and food industry. Although it is biocompatible, HA is bio-degradable and easily degraded by enzymes such as hyaluronidase (enzymatic degradation) posing a relatively short residence time in tissues. It is of the order of half-life of less than one week. Also, HA is not able to withstand elevated temperature for any considerable period of time. It is subjected to thermal degradation, which means it is degraded by free radicals, by hydrolysis. For example, HA in aqueous solution under conditions of autoclaving at 121° C. for several minutes undergoes substantial decrease in MW. The decrease in MW is accelerated exponentially above 60° C. Other than enzymatic, thermal and radical degradation, HA is subjected to mechanical degradation, for example: degradation due to shear forces. All types of degradation mentioned above pose a relatively short residence time in tissues.

Chemical modification, functionalization or derivatization of HA with organic groups enable alteration of the chemical and physical properties of HA in a controlled way to obtain new biomaterial with new desired and improved properties. Depending on the type and degree of modification, the modified HA is a different chemical than the native HA and thus may be less natural, biocompatible and even its biological behavior may be altered. Despite that, one should measure the benefit and outcome the modification leads to its service as a medical application. For example, HA has low solubility in organic solvents. Reaction with alcohols may alter its lipophobic nature to more lipophilic nature, thus increasing its solubility in organic solvents. As the HA derivative is less soluble in water, it may have increased in vivo residence time. In addition, it may possess improved interaction with molecules such as drugs. Another example is crosslinked HA hydrogel used as a cosmetic implant, cosmetic dermal filler which is introduced into the skin to augment tissue, add volume and reduce wrinkles is intended to extend HA in vivo residence time which is crucial to its clinical success.

The MW of HA molecule for cosmetic and augmentation purposes is usually in the order of hundreds of thousands to several millions Da. Non-crosslinked HA that may be used as dermal filler has high MW to sustain in vivo stability and is too viscous to inject through a fine gauge needle (commonly referred to needles in the range from 27 G and above, in practice until 30 G) whereas low MW is easily injected but lacks stability. One of the methods to overcome this drawback is by chemical modification as crosslinking. HA chemical crosslinking is achieved by reacting non-crosslinked HA with a crosslinker agent to form a HA infinite 3-dimensional (3D) network that is no longer water soluble in aqueous media composing the HA hydrogel which possess improved in vivo stability. Nevertheless, this step of chemical reaction or modification adds further steps of chemical reagent handling and purification of the reaction products. Usually, the chemical reagents are water soluble and chemical reactions and purifications are performed in aqueous media. As been stated above, one should measure the benefit and outcome the modification leads to its service as a medical application. Following that statement, crosslinked HA gel overcomes the drawbacks of non-crosslinked HA and can be used as skin filler, tissue augmentation for cosmetic purposes, such as facial tissue augmentation by adding volume to facial tissue, correct wrinkles and folds and restore a smooth appearance to the face.

Hydroxyapatite (HAp) has the following chemical formula: $Ca_{10}(PO_4)_6(OH)_2$ (Ca/P ratio=1.67). HAp is a particulate Calcium Phosphate ceramic. HAp occurs naturally as geological deposits and in normal biological tissues such as bone, cartilage, enamel, dentin and cementum of vertebrates and in many sites of pathological calcifications such as blood vessels and skin. 75% w (all percentages given weight per weight unless otherwise indicated) of the human bone consists of bioapatite to grant the bone its stiffness and resistance to mechanical load. The morphology of bioapatite is flat elongated grains with a hexagonal structure.

HAp is an implantable material, thermodynamically stable under physiological conditions, which has excellent biocompatibility (non-toxic, non-immunogenic) and bioactivity, possibility to stimulate formation of cells and reparation of tissue. It may stimulate cellular response, collagen synthesis, used as a cell transformation vehicle, gene delivery vehicle, etc. HAp find use in tissue engineering applications such as bone and tooth substitute material for repair and replacement purposes. There are a lot of methods reported for HAp synthesis including plasma spraying, hydrothermal synthesis, freeze drying, sol-gel, phase transformation, mechanochemical synthesis, chemical precipitation, etc. The morphology of synthetic HAp reported is either monoclinic or hexagonal crystallites and key factors for medical purposes are Ca/P ratio and the size of the powder grains. Typically, HAp powder has a particle size in range of 10 µm and 100 µm. Typically, the nano-powder form of HAp has a particle size in the range of 1 nm to 100 nm. Typically, HAp particles in a dermal filler are round, uniform, smooth with low surface area. Nevertheless, HAp particles may have irregular shape, may be porous, hollow, flower-like porous hollow microspheres, or any other suitable shape with a high surface area.

Generally, HA based dermal and subdermal fillers comprise HA in the order of hundreds of thousands to several millions Da, optionally with a bi or poly functional crosslinker forming covalent bonds with HA under alkaline or acidic conditions. For example, diepoxides such as 1,4-butanediol diglycidyl ether (BDDE) and 1,2-ethanediol diglycidyl ether (EDDE) under alkaline conditions react with hydroxyl group to form an ether linkage, whereas under acidic conditions the reaction that occurs instead forms an ester. The most common dermal fillers in the market were crosslinked with crosslinkers such as BDDE and divinyl sulfone (DVS). Nevertheless, any other bi or polyfunctional crosslinkers may be used for crosslinking including but not limited to epoxy compounds, DVS, formaldehyde, polyaziridine, amino acids or esters, carbodiimides, etc. in direct reaction with HA. HA can be crosslinked by using bi or polyfunctional molecules as side groups that on one hand bond to HA and on the other hand additional single bi or polyfunctional crosslinker or several crosslinkers in a raw is used to bond both ends of side groups.

In addition, it may comprise uncrosslinked HA in the order of hundreds of thousands to several millions Da in order to assist in the extrusion through a fine gauge needle. In addition, it may comprise one or more active supplements each with its own unique property, such as anesthetic agents, antioxidants, vitamins, etc. Not limited to, but some examples are Lidocaine, Mannitol, Vitamin C, etc. respectively. The concentration of HA in HA dermal filler may range from 1 mg/ml to 50 mg/ml and more specifically to 15-30 mg/ml where each concentration is most suitable to specific area for tissue filling and augmentation.

The typical methodology of preparation of crosslinked HA dermal filler includes several basic steps known to those of ordinary skill in the art. The first step is hydrating the dry HA. The next step is introducing HA to a crosslinker in order to crosslink HA either in alkaline or acidic environment. The next step includes stripping the residual crosslinker off usually by means of dialysis and swelling the crosslinked HA using purified water or phosphate buffer solution (PBS). For example, dialysis in a dialysis bag with a 12,000 MW cutoff for few days until most of the residual crosslinker is removed. The next step includes the addition of active supplements and addition of uncrosslinked HA and homogenizing the entire composition. The next step includes sterilization to finalize the HA dermal filler with the proper dermal filler properties such as rheological properties, extrusion force, pH, osmolarity, etc.

Generally, HAp dermal fillers comprise HAp microspheres particles up to 60% w/w that are homogeneously suspended in a high viscous liquid or gel that acts as a carrier material. Typically, the HAp particles in a dermal filler are round, uniform, smooth, low surface area having a diameter between approximately 10 and 100µ in diameter, most preferably between 25 to 50µ in diameter. In one example, HAp microspheres are suspended in a carrier composed of carboxymethylcellulose (CMC), Glycerin and water. In another example, HAp microspheres are suspended in a carrier composed of HA and water. In another example, HAp microspheres are suspended in a carrier composed of crosslinked HA as described above where HAp microspheres are added during or after HA crosslinking process. These compositions and relative ingredients concentration are known to those of ordinary skill in the art, for example, the common HAp concentration in such compositions is 55.7% w/w or less. In all of the examples, HAp microspheres are suspended in highly viscous liquid or gel and there is no real bond between the HA and HAp. The carrier serves as a tool to transfer the HAp microspheres into the designated area for tissue filling and augmentation and to prevent microspheres from aggregation both in the syringe and in the body. It serves to prevent from HAp sedimentation and phase separation. In addition, to keep the microspheres within their desired location, prevent them from dispersing in the injected area.

SUMMARY

The invention, in at least some embodiments, features compositions based on HA and HAp in the field of soft tissue fillers, and a method of manufacturing thereof. Optionally, the dermal fillers are useful for enhancing facial tissue augmentation by adding volume to facial tissue, correct wrinkles and folds and restore a smooth appearance to the face. Optionally, the dermal filler comprises uncrosslinked or crosslinked HA chemically bonded to HAp. The combination of chemically anchored HA to the surface of HAp has a synergistic effect of prolonged tissue augmentation due to slower degradation of both components without reduction in their intrinsic ability to function as skin rejuvenation components. These and other aspects and advantages of the invention may be more readily understood and appreciated with in the detailed description.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the embodiments of the invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings.

DETAILED DESCRIPTION

Figure 1:
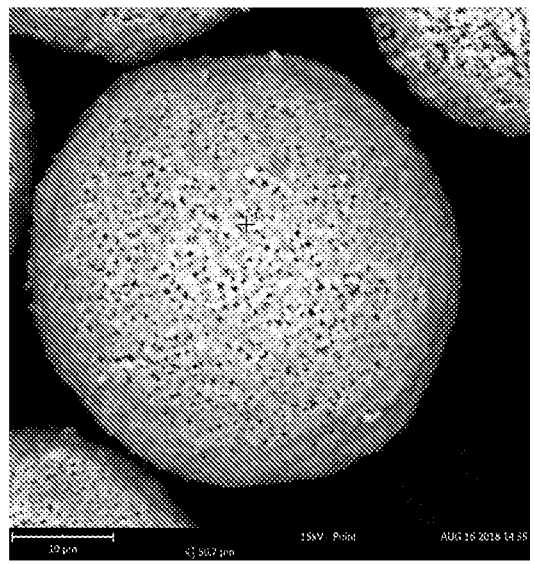
FIG. 1 shows untreated HAp microspheres under SEM.

According to the background art, HAp microspheres are added to a carrier which is high viscous liquid or gel. In one example, the HAp microspheres are added to crosslinked HA where it serves again as a carrier. The combination of both HA and HAp has an additive effect, not a synergistic effect. The additive effect is of the following: the HAp microspheres are degrading slowly without foreign body reaction serving as a scaffold for natural tissue growth and HA hydrating and supporting extracellular matrix. A synergistic effect between HA and HAp is quite questionable, due to the fact that the crosslinked HA network and HAp microspheres form a simple mixture, in which the HA gel is the continuous phase and the HAp microspheres are the dispersed phase. In such a simple mixture, each component maintains its own properties without having a synergistic effect.

In addition, it was claimed that addition of HAp to HA before crosslinking may form an encapsulated structure of the following structure of HAp encapsulated by HA. It was claimed that this encapsulated structure may prolong the degradation of HAp as HA until it is degraded, having served as a shield which may prevent HAp degradation. Again this is questionable, due to the fact that there is no real bond between HAp and HA in these prior art compositions.

First, in an ideal state or system of encapsulated HAp with HA, there is some mechanism of protection from HAp degradation by the HA encapsulation until the encapsulation is breached. This ideal state would occur depending on thickness of the encapsulation. However, even in such an ideal state, there is no mechanism of protection from HA degradation. And secondly, the system is not ideal, thus as a consequence, a large portion of the HAp microspheres are not encapsulated. The state of the microspheres ranges from partially HA cover to non HA encapsulation of HAp microspheres. Without wishing to be limited by a single hypothesis, this is likely to be due to the fact that HAp microspheres are orders of magnitude larger than HA chains (end to end distance).

In the prior art compositions, such short chains are agitated forming local, micro 3D networks which do not necessarily entrap HAp microspheres, resulting in some encapsulated HAp microspheres and some non-encapsulated HAp microspheres. Most of the encapsulated HAp microspheres are likely to be non-encapsulated, due to their relative size as explained above. Again, the result may be considered as simple mixing, and not true encapsulation.

Thus, one could inject in the same area different dermal fillers based on HA and HAp separately in order to achieve the same gain from mixing, which is usually being done. In addition, the mere addition of high concentration of HAp microspheres into crosslinked HA imposes additional detrimental effect of viscous effect and high extrusion force in relative to uncrosslinked HA carrier. The simple solution to overcome this problem is to reduce the concentration of HAp microspheres. Nevertheless, again using different types of dermal fillers at the same area may aid in overcoming the problem.

In order to achieve synergistic effect of both HA and HAp, it is desirable to form a HA based composite containing HAp as an additive. A composite is viewed as a blend of several additives possessing different and distinct functionalities and a polymer matrix that binds and links them together for the purpose of forming a polymer-based material with improved properties well above the intrinsic properties of the polymer or to grant it new properties. The HA composite material properties do not solely depend on the fractional volume of HAp microspheres, but also upon the chemical and physical interactions with the HA gel such as the polymer network and the interfacial parameters (compatibility, wettability and bonding, described collectively herein as "adhesion"). Adhesion is important to achieve improvement in composite properties. In addition, improved adhesion also will aid in better dispersing the additive in the network.

A coupling agent is defined as a compound which provides, in a classical view, chemical bond between two dissimilar materials, usually an inorganic material and an organic material as in case of HA and HAp. Coupling agents may also provide other interactions than chemical bond between the two dissimilar materials such as ionic interactions, hydrogen bonding, etc. up to weak van der Waals (VDW) interactions. As one example, coupling agents may be applied during mixing of the polymer and the additive. In another example, the coupling agent may be applied as surface modification of the additive or as a new functional group introduced on the polymer chain followed by interaction with the other moiety, as well as combinations thereof. All of the above are considered as pathways for increasing the adhesion between the polymer and the additive. The increased adhesion forces between the additive and the polymer range from strong chemical bonds or electric attraction to weak VDW interactions.

The use of any mechanism of coupling agent as explained above is possible, but the most favorable is the use of surface modification due to the sensitivity of HA such as thermal, shear, enzymatic degradation and so on as explained above. In addition, the use of coupling agent during mixing or introduced as functional group may interfere with the crosslinking stage of HA to form a crosslinked gel in case of a composite containing crosslinked HA.

HA and HAp in contact may have interactions of the order of VDW, hydrogen bonds or even ionic interactions which are considered as not permanent. Whereas, creating a covalent bond between HA and HAp which may be considered as permanent, will result in forming a real composite material having the benefits of both HA and HAp. The simplest way to achieve chemical bonding between the HAp surface and the HA molecules is by the use of coupling agents and in particular surface treatment with organofunctional Silanes. The type of silane coupling agent, silane surface treatment is selected according to the surface chemistry of the additive and the polymer. Other types of coupling agents may be used in the same manner, for example zirconates, titanates, etc. Other paths to achieve a covalent bond between HA and HAp may include the use of crosslinkers, chelating agents or even using multiple coupling agents in a row pointing out of the additive surface which may result in the same effect of chemical bonding.

HAp has a tendency to aggregate due to VDW and Hydrogen bond interactions. Another advantage of using Silanes is in aid of preventing aggregation due to the elimination of those interactions and to some extent contribute steric hindrance.

The most common chemical structure of organofanctional silane is R—Si—$X_3$ where the X is an alkoxy group that may hydrolyze to reactive groups on the surface and R is organofunctional group the can react with the polymer matrix. Other types of organofunctional silane with less than three alkoxy groups are also suitable for reacting with the surface. Alternatively, X is a chlorine atom. Nevertheless, the use of these materials is limited commercially due to the difficulty in handling the corrosive, flammable or toxic byproducts associated with hydrolysis.

There are two main techniques for the insertion of the silane:

a. Pretreatment—the direct application of the pure silane or its solution in an organic solvent diluted with water which accelerates the reaction, to the additive. Usually, this technique is accomplished by spraying or immersing the additive with the silane agent (surface finish).

b. Addition of the silane to the polymer followed by the untreated additive. This technique is considered rare.

In case of HA and HAp, the preferred method is the pretreatment wherein the HAp particles are silane coated before introduction to HA.

The result of industrial pretreatment process is forming a thick three-dimensional crosslinked silane multi-layer (polysiloxane network). Silane monolayer, which nowadays can only be obtained by vapor phase sililation techniques, usually is out of the scope of industrial practice.

The organofunctional group of the Silane is selected according to the type of interaction that is favorable between the polymer and the additive. The interaction may be of the order of weak VDW forces, hydrophilic-hydrophobic interactions and up to chemical covalent bonds. There is a large variety of possible R groups and the specific species is selected by its affinity to the polymer matrix. It should be noted that more than one type of silane might be effectively used with a given polymer. Thus, for a specific polymer, the most suitable organofunctionalsilane coupling agent selected should result in chemical bonding and interdiffusion through the matrix to form a network with the polymer.

For example, Silane surface treatments such as 3-Glycidoxypropyltrimethoxysilane or 3-Glycidoxypropyltriethoxysilane or other epoxy functional grouped silane which may act as the BDDE crosslinker and take part in chemical reaction occurring during the HA gel cure and thus form a bond between surface treated HAp and HA.

The common BDDE curing mechanism of HA includes reaction with BDDE, chemical formula 1,4-butanediol diglycidyl ether, which has two functional epoxy groups that under alkaline conditions yield a stable covalent ether linkage between HA and the cross-linker just as 3-Glycidoxypropyltrimethoxysilane has a functional epoxy group that can crosslink HAp to HA. The R— group of 3-Glycidoxypropyltrimethoxysilane, the epoxy group may take the role of BDDE and act as a crosslinker. As been stated above, crosslinkers are also a path to achieve a covalent bond between HA and HAp. In this case, BDDE can also bond between HA and HAp as on one side bond to HA and on the other side bond to the surface of HAp forming ether linkages or in extreme case, radical quenching on the surface of HAp. The problem in such a system is to control the crosslinking degree in both, HA chains crosslinking between themselves and the HA and HAp crosslinking due to the competition on crosslinking sites both on HA and HAp. Higher concentration of BDDE would be required to achieve comparable or if any properties to the method of surface treatment of HAp followed by crosslinking to form the HA and HAp composite.

Another possibility is vinyltrimethoxysilane or vinyltriethoxysilane or vinyltrichlorosilane as an example of chlorosilane or other vinyl functional grouped silane which may act as the DVS crosslinker and take part in chemical reaction occurring during the HA gel cure and thus form a bond between surface treated HAp and HA.

The common DVS curing mechanism of HA includes reaction with DVS, which has two functional vinyl groups that under alkaline conditions yield a stable covalent ether linkage between HA and the cross-linker just as vinyltrimethoxysilane has a functional vinyl group that can crosslink HAp to HA. The R— group of vinyltrimethoxysilane, the vinyl group may take the role of DVS and act as a crosslinker.

The number of possibilities is huge to crosslink HA and HAp, another example is adipic acid dihydrazide (ADH) as crosslinker and 3-aminopropyltriethoxysilane or 3-aminopropyltrimethoxysilane or other amino functional grouped silane can take the role of ADH and act as a crosslinker. But, not all reactions are favorable due to HA sensitivity as explained above. The silane examples of epoxy functional grouped silane and vinyl functional grouped silane are imitating the most common procedures of HA crosslinking out in the dermal filler market and may be easily implemented in the HA and HAp composite either in crosslinked HA composition or not. As stated above, a three-dimensional crosslinked silane multi-layer is formed during silylation on HAp microsphere surface. There is no full coverage of bonded silane on the surface due to the three-dimensional structure. Thus, there are domains on the surface that are silane treated and domains that are free of silane giving the surface a topography of isolated or interconnected treated patches in a larger untreated area visualized as islands or interconnected (bridged) islands in the sea. The surface bonded silane domains are the islands spread out in the sea of free HAp surface. The surface texture of islands in the sea may be tailored depending on the concentration of silane used.

Without wishing to be limited to change of concentration, other methods may be applied to tailor the surface topography and affinity such as Janus particle technique. A Janus particle is an antisymmetric particle with two distinct physical properties for example, HAp particle with one hemisphere surface sized with silane and the other hemisphere untreated. The surface topography and affinity are different between the two hemispheres. Different methods of forming Janus particles exist and may be applied, for example masking method in which particles are trapped at the interface between two phases allowing the untreated hemisphere to be masked and the other hemisphere to be sized and thus the modification to the particle surface is made only on one side.

Another example of such a method to tailor the surface topography and affinity is the use of mixture of silane reagents with different functionalities, for example one silane that may react with HA chains and the other not. In an extreme case, forming a Janus particle with one hemisphere surface sized with reactive silane and the other hemisphere with unreactive silane. In any of the examples mentioned, the silane treated area has the topography of isolated or interconnected treated patches in a larger untreated area. The surface treatment is of the order of nano-metric scale on the order of micron scale sized microspheres. This type of surface topography allows the HAp slow degradation and serve as a scaffold for natural tissue growth. It is reasonable to assume that in such a structure, the degradation may be slower than untreated HAp microspheres.

The HA chains are adsorbed on the surface of the surface treated HAp. An adsorbed HA chain on the surface forms trains (part of the chain that is in contact with the surface), loops (part of the chain that is not in contact with the surface and bounded by two trains) and two tails (part of the chain that is not in contact with the surface and bounded on one side by a train and free on the other side). The adsorption involves the formation of physical interactions and chemical bonds, denoted as physisorption and chemisorption, respectively. Thus, it is reasonable to assume that some of the trains of HA chains are covalently adhered to the surface and the adsorption is irreversible and permanent. This structure implies that the HAp microspheres also act as crosslinking sites in the gel formed. It is reasonable to assume that crosslinker concentration in presence of surface treated microspheres may be lowered to have the same crosslinking effect, thus these microspheres can substitute to some extent the crosslinker. In addition, the effect of a microsphere as a crosslinking site is local increased mechanical strength, an anchoring site that may assist in more stable volume effect especially in deep wrinkles. In addition, HA chains that are adhered to the surface are less susceptible to enzymatic degradation. It is reasonable to assume that such part of the chain defined as trains are less prone to enzymatic degradation as they are bonded to the surface. The degradation of part of the chain defined as loops and tails depends on their relative size and accessibility by enzymes. Thus, overall HA chains in proximity of HAp microspheres are less prone to enzymatic degradation which may assist in more robust volume effect and longevity use in the injected area. In addition, the improved mechanical strength of HA composite containing HAp as crosslinks whereas the microspheres act as anchoring points may aid substantially in areas where dynamic wrinkles and folds require higher resistance to muscle action. From the mentioned above, it is clearly understood that the HA containing chemically bonded HAp particles is considered as a composite, a reinforced gel with improved properties such as mechanical, degradation resistance, etc. or properties can be tailor made depending on the application required. Other types of surface treated microspheres, biodegradable or not, inert or stimulating, may be used for the effect of anchoring HA chains, such as Polylactic acid microspheres.

As mentioned above, HA and HAp in contact in simple mixture rather than a composite may have interactions of the order of VDW, hydrogen bonds or even ionic interactions which are considered as not permanent. Upon injection, the mixture is exposed to body tissue and body fluids which may have the same interactions of the order of VDW, hydrogen bonds or even ionic interactions with either HA and HAp which may result in loss of interaction between HA and HAp as opposed to permanent chemical covalent interaction between HA and HAp.

Thus, in a mixture, the HA chains and HAp microspheres will degrade as if they were solely injected whereas in a composite, the synergistic effect is that both HA chains and HAp microspheres will degrade much slower allowing longer term of use in the body, longer in vivo residence time, hence prolonged tissue augmentation. As described above, the use of crosslinkers is considered as chemical modification or crosslinking stabilization of HA whereas the addition of chemically bonding particles may be considered as physical and chemical modification of HA by crosslinking to particles. The latter is also a method for HA stabilization by particles in general and in particular of HAp in addition to crosslinking stabilization.

Some additional benefits that might rise from the use of the HA and HAp composite is to avoid Tyndall effect as the HAp is opaque or reduce whiteness in thin areas as HA is translucent. In addition, the HAp is radiopaque and thus the entire composition is easily detectable in radiography during or after injection.

Overall, it may be viewed as a chemical modification, functionalization or derivatization of HA with inorganic groups such as silane surface treated ceramic HAp which allows to alter the chemical and physical properties of HA in a controlled way to obtain new biomaterial with new desired and improved properties.

As been stated above, HA and bi or poly functional crosslinker may form a covalent bond under alkaline or acidic conditions. An addition of a dendrimer poly-functional crosslinker may pose another advantage of reduced viscosity and higher longevity in the tissue. Dendrimer is a macromolecule with precise molecular weight, hyperbranched structure which defines an ellipsoidal or globular shape. Dendrimers are build of a central core and a series of radically concentric layers in the branches called "generations" which define its shape. Usually, the effective functional groups which may react with other moieties are located on the outermost generation (that is the outermost parts of the branches). For example, reaction of HA with both BDDE (bi epoxy-functional crosslinker) and epoxy functional dendritic molecule may result in softer gel and lower extrusion force through a fine gauge needle and in a gel with higher longevity in the tissue due to the dendritic structure of the dendrimer crosslink.

Alternatively, the uncrosslinked HA, some of it or all, in a dermal filler may be crosslinked using an epoxy functional dendrimer, thus maintaining low viscosity which may assist in the extrusion through a fine gauge needle and to some extent exhibit higher longevity in the tissue than uncrosslinked HA. A fine gauge needle is for example one with a gauge in a range of from 27 G until 30 G. Optionally said higher longevity may be at least 20% longer than for the HA dermal filler composition, at least 50% longer, at least 100% longer, at least 200% longer, at least 500% longer or any integral value in between. The higher longevity is for the cross-linked HA, which may for example be cross-linked with BDDE and dendrimer. The gel product, such as the final dermal filler, may for example comprise about 90% cross-linked gel and 10% uncrosslinked HA. The presence of uncrosslinked HA reduces the viscosity of the gel and lubricates it to ease in extrusion from the syringe.

Non-limiting examples of such epoxy functional dendrimers may be found in Multiply Functionalized Dendrimers: Protecting-Group-Free Synthesis through Sequential Thiol-Epoxy 'Click' Chemistry and Esterification Reaction (RSC Advances, submitted May 4, 2015, Khan et al; see for example molecule 8 as a non-limiting example of an epoxy dendrimer).

As been stated above, HA and bi or poly functional crosslinker may form a covalent bond under alkaline or acidic conditions. An addition of a POSS® (Polyhedral Oligomeric Silsesquioxane) cage molecule as a poly-functional crosslinker such as for example epoxy functional POSS®, such as for example glycidyl POSS® (epoxy functional Silsesquioxane) may pose several advantage of reduced viscosity and higher longevity in the tissue. Different organic functionalities may be tailored to the base cage structure, such as for example the epoxy functional group in glycidyl POSS®. For example, reaction of HA with both BDDE and glycidyl POSS® molecule may result in softer gel and lower extrusion force through a fine gauge needle, and also in a gel with higher longevity in the tissue due to the cage structure of the glycidyl POSS® crosslink. Alternatively, the uncrosslinked HA, some of it or all, in a dermal filler may be crosslinked using glycidyl POSS®, thus maintaining low viscosity which may assist in the extrusion through a fine gauge needle and to some extent exhibit higher longevity in the tissue than uncrosslinked HA.

The above description of fine gauge and/or higher longevity may also apply for this embodiment with POSS®.

POSS® that is tailored with an appropriate organic functionality can also serve as a coupling agent, for example in case where alkoxy functionality as in Silanes and epoxy functionality are both present in the base cage structure. Such POSS® structure can couple both ends of HA and HAp just as Silane surface treatment. The procedure of applying POSS® as coupling agent is similar to the described above.

Although, the above described material featured a polysaccharide, in particular HA chemically bonded to a particulate Calcium Phosphate ceramic, such as for example HAp by the use of a coupling agent, it is not meant to be limiting in any way. Other polysaccharides such as heparosan can follow the same bonding procedure as HA to HAp and other types of surface treated microspheres, such as biodegradable Polylactic acid microspheres can take the role of HAp in surface anchoring HA chains.

Although, the above described relates to dermal fillers, in particular facial dermal fillers, it by not any means imply on a limited case. Other anatomical areas in the body may be filled or augmented, such as neck, buttocks, chest, breast, hand, calf, etc. In addition, it may be used as a non-surgical alternative or complement to surgery in nasal reshaping, tip grafting. In addition, it may be used throughout the body to blur skin marks such as scars, acne scars, striae—stretch marks, etc. In addition, it may find advantages and used in fields, such as bone and teeth reconstruction whereas HAp is the main component. In addition, it may find advantages and used in fields, such as joint lubrication for improving joint mobility and shock absorbing capability.

Example 1—Silane Surface Treatment

1. Silane Treatment Solution Preparation (2% Silane in Total Volume):

93.25% vol. Methanol is mixed with 3.93% vol. of distilled water. 0.81% vol. Acetic acid is added to buffer the solution to a pH of 4.5-5.5. 2% vol. of the functional silane is added to the solution. Lower silane concentration may be used to tailor the surface silane coverage.

2. Silane Treatment:

The solution is agitated for 1-10 min and during that time, silanol groups are formed in the solution. The HAp microspheres are introduced to the solution for approximately 30 min. Then, the HAp microspheres are rinsed twice in pure methanol. The HAp microspheres are inserted to an oven with temp ranging from 70° C. and up to 105° C. for between 1 to 24 hrs in order to cure and finalize the procedure to form the silane layer or are left to cure overnight at room temperature. The time durations and temperatures given are silane type dependent, for example: 70° C. for 24 hrs is suitable for 3-Glycidoxypropyltrimethoxysilane in order to prevent degradation of silane epoxy functional groups.

High shear mixer, rotor stator mixer, homogenizer or probe-type supersonic generating device can be used in order to prevent microspheres agglomeration.

Example 2—Non-Crosslinked HA Containing HAp Microspheres Dermal Filler Formulation Raw material NaHA, for example of MW two mega Da, in any form of fiber or powder is introduced into an alkaline solution. The NaHA is agitated, dissolved and hydrated in the alkaline solution at room temperature for several hours until a homogenous HA viscous liquid is formed.

The 3-Glycidoxypropyltrimethoxysilane surface treated HAp are introduced to the HA viscous liquid under agitation to form a dispersion. The dispersion is heated to 50° C. for several hours to allow the bond formation between HA and surface treated HAp. The reaction may be employed without agitation in case where the dispersion is highly viscous and the microspheres are immobilized in the dispersion due to the high viscosity. In case the microspheres are labile to sink, a mixer or probe-type supersonic generating device can be used in order to prevent microspheres sinking and agglomeration. Then the dispersion is cooled back to room temperature. Then the dispersion is swollen and dialyzed with PBS in dialysis bag with a 12,000 MW cutoff for few days to remove low molecular weight residuals. The PBS is regularly changed in order to introduce fresh PBS to the dispersion. For example, degree of swelling is determined to form a dispersion containing 30% v/v of HAp or less. Due to the synergistic effect, the concentration of both HA and HAp may be lowered and still have the same effect as common dermal fillers available on the market. The dispersion is filled into syringes, sterilized and ready for use. Alternatively, the HA surface bonded HAp microspheres may be incorporated in other gel carrier composed of carboxymethylcellulose (CMC), Glycerin and water.

Example 3—Crosslinked HA Containing HAp Microspheres Dermal Filler Formulation

The basic steps of the crosslinking procedure are known to those of ordinary skill in the art. Raw material NaHA, for example two Mega Da, in any form of fiber or powder is introduced into an alkaline solution. The NaHA is agitated, dissolved and hydrated in the alkaline solution at room temperature for several hours until a homogenous HA viscous liquid is formed.

BDDE and 3-Glycidoxypropyltrimethoxysilane surface treated HAp are introduced to the HA viscous liquid under agitation to form a dispersion. The dispersion is heated to 50° C. for several hours to allow the bond formation between HA and surface treated HAp. The reaction may be employed without agitation in case where the dispersion is highly viscous and the microspheres are immobilized in the dispersion due to the high viscosity. In case the microspheres are labile to sink, a mixer or probe-type supersonic generating device can be used in order to prevent microspheres sinking and agglomeration. Then the composite gel is cooled back to room temperature. Then the composite gel is swollen and dialyzed with PBS in dialysis bag with a 12,000 MW cutoff for few days to remove low molecular weight residuals including excess BDDE. The PBS is regularly changed in order to introduce fresh PBS to the composite gel. Non crosslinked HA is added to the composite gel in order to aid in reducing extrusion force. For example, a composite gel may contain 30% v/v HAp. The composite gel is filled into syringes, sterilized and ready for use.

Example 4—Testing of Silane Treated Particles

HAp microspheres were prepared according to Example 1 above.
Material Used:
1. HAp microspheres medical grade, spherical 15-60 microns, D50=35 microns.
2. 3-Glycidoxypropyltrimethoxysilane >98% Sigma Aldrich
3. Methanol >99.9% HPLC grade Sigma Aldrich
4. Acetic Acid >99.7% ACS reagent grade Sigma Aldrich
SEM+EDS:
Apparatus: Phenom ProX Desktop SEM
SEM+EDS Analysis Scanning electron microscope (SEM) coupled with energy dispersive spectroscopy (EDS) technique was employed to obtain localized chemical, elemental analysis of untreated HAp microspheres and 3-Glycidoxypropyltrimethoxysilane treated HAp microspheres. SEM micrographs and EDS quantitative analysis of the elements concentrations on the surface were obtained.

Figure 2:
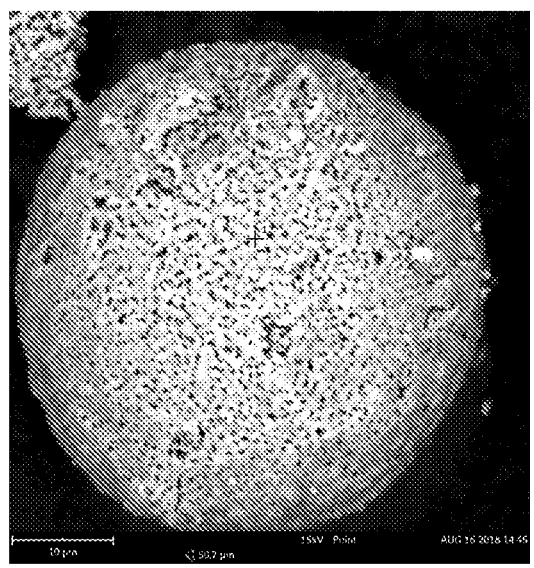
FIG. 2 shows treated HAp microspheres under SEM, after treatment with 3-Glycidoxypropyltrimethoxysilane.

SEM micrographs depicted in FIGS. 1 and 2 show untreated and 3-Glycidoxypropyltrimethoxysilane treated HAp microspheres respectively. Both sets of microspheres exhibit similarity in morphological structure indicating that the application of silane surface treatment on the HAp microspheres did not deteriorate the microspheres.

The EDS analysis of untreated HAp revealed the presence of Ca, P and O atoms as expected of HAp. As can be seen from table 1, the atomic ratio of Ca/P is ~1.67 as expected of HAp.

The EDS analysis of 3-Glycidoxypropyltrimethoxysilane treated HAp revealed in addition to Ca, P and O atoms, the presence of Si atom indicating the presence of silane surface treatment. As been stated above, the result of industrial pretreatment process is forming a thick three-dimensional crosslinked silane multi-layer (polysiloxane network) which thus may deviate the atomic ratio of Ca/P from 1.67 theoretical value as can be seen in table 2 and is indicative of the presence of silane surface treatment in respect to untreated surface.

TABLE 1

Elemental analysis of untreated HAp microsphere

| Element Number | Element Symbol | Element Name | Atomic Conc. | Weight Conc. |
|---|---|---|---|---|
| 8 | O | Oxygen | 68.28 | 48.43 |
| 20 | Ca | Calcium | 19.82 | 35.22 |
| 15 | P | Phosphorus | 11.90 | 16.35 |

TABLE 2

Elemental analysis of 3-Glycidoxypropyltrimethoxysilane treated HAp microsphere

| Element Number | Element Symbol | Element Name | Atomic Conc. | Weight Conc. |
|---|---|---|---|---|
| 8 | O | Oxygen | 58.88 | 38.46 |
| 20 | Ca | Calcium | 25.75 | 42.13 |
| 15 | P | Phosphorus | 15.22 | 19.24 |
| 14 | Si | Silicon | 0.15 | 0.18 |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, patent applications and sequences identified by their accession numbers mentioned in this specification are herein incorporated in their entirety by reference into the specification, to the same extent as if each individual publication, patent, patent application or sequence identified by their accession number was specifically and individually indicated to be incorporated herein by reference. In addition, citation or identification of any reference in this application shall not be construed as an admission that such reference is available as prior art to the invention.

The invention claimed is:

1. A composition comprising a polysaccharide covalently bonded to particulate hydroxyapatite (HAp) pretreated with organofunctional silane,
wherein the particulate HAp pretreated with organofunctional silane comprises domains that are organofunctional silane treated and domains that are free of organofunctional silane and a polysaccharide covalently bonded to the domains that are organofunctional silane treated,
wherein the domains that are free of organofunctional silane are not covalently bonded to the polysaccharide, and
wherein chains of the polysaccharide are cross-linked by the particulate HAp pretreated with organofunctional silane.

2. The composition of claim 1, wherein said polysaccharide is hyaluronic acid (HA) or heparosan.

3. The composition of claim 1, wherein the composition is formed by reacting the particulate HAp with the polysaccharide.

4. The composition of claim 1, further comprising a carrier suitable for insertion into a mammalian subject as a dermal filler.

5. The composition of claim 1, wherein chains of said polysaccharide are stabilized by the particulate HAp.

6. The composition of claim 1, wherein the organofunctional silane has at least one alkoxy group or at least one chlorine atom.

7. The composition of claim 6, wherein the organofunctional silane has a formula of —R—Si—$X_3$ where X is an alkoxy group configured to hydrolyze and form a reactive group on the surface of the particulate HAp and R is an organofunctional group configured to react with the polysaccharide.

8. The composition of claim 6, wherein the organofunctional silane is a silane comprising an epoxy functional group, a silane comprising a vinyl functional group, or a silane comprising an amino functional group.

9. The composition of claim 8, wherein the silane comprising an epoxy functional group comprises one or more of 3-glycidoxypropyltrimethoxysilane and 3-glycidoxypropyltriethoxysilane.

10. The composition of claim 8, wherein the silane comprising a vinyl functional group comprises one or more of vinyltrimethoxysilane, vinyltriethoxysilane and vinyltrichlorosilane.

11. The composition of claim 8, wherein the silane comprising an amino functional group comprises one or more of 3-aminopropyltriethoxy silane and 3-aminopropyltrimethoxy silane.

12. The composition of claim 1, wherein the particulate HAp is in a form of microparticles.

13. The composition of claim 1, wherein the particulate HAp is in a form of nano-powder having a particle size in a range of from 1 nm to 100 nm.

14. The composition of claim 1, wherein the particulate HAp is in a form of microspheres.

15. The composition of claim 1, wherein the particulate HAp is in a form of particles having a particle size in a range of from 10 μm to 100 μm.

16. The composition of claim 1, wherein the particulate HAp comprises particles having a round shape, particles having an irregular shape, porous particles, or hollow particles.

17. The composition of claim 1, further comprising polysaccharide chains cross-linked with a dendrimer poly-functional cross-linker.

18. The composition of claim 17, wherein the polysaccharide chains cross-linked with the dendrimer poly-functional cross-linker are formed by cross-linking a plurality of uncross-linked polysaccharide chains with the dendrimer poly-functional cross-linker such that the composition has a viscosity suitable for extrusion through a needle having a gauge in the range of from 27G to 30G.

* * * * *